United States Patent
Ghosh et al.

(10) Patent No.: US 7,460,527 B2
(45) Date of Patent: Dec. 2, 2008

(54) PORT AGGREGATION FOR FIBRE CHANNEL INTERFACES

(75) Inventors: Kalyan Ghosh, Santa Clara, CA (US);
Praveen Jain, San Jose, CA (US);
Shankar Subramanian, San Jose, CA (US); Rajesh Bhandari, San Jose, CA (US); Prabesh Babu Nanjundaiah, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 659 days.

(21) Appl. No.: 10/923,223

(22) Filed: Aug. 20, 2004

(65) Prior Publication Data

US 2006/0039366 A1    Feb. 23, 2006

(51) Int. Cl.
*H04L 12/50* (2006.01)
*H04L 12/56* (2006.01)
*H04L 12/42* (2006.01)

(52) U.S. Cl. ............... 370/360; 370/352; 370/386; 370/395.3; 370/449; 709/249; 398/45

(58) Field of Classification Search ............... 370/248, 370/253, 400, 401, 434, 464, 509, 520, 522, 370/537, 352, 360, 386, 449, 395.2, 395.3; 709/220–222, 227, 245, 249; 398/45
See application file for complete search history.

(56) References Cited

U.S. PATENT DOCUMENTS

| | | | |
|---|---|---|---|
| 5,805,924 A * | 9/1998 | Stoevhase | 710/11 |
| 6,631,141 B1 | 10/2003 | Kumar et al. | |
| 6,687,758 B2 | 2/2004 | Craft et al. | |
| 7,130,909 B2 * | 10/2006 | Yamashita et al. | 709/226 |
| 2002/0103921 A1 | 8/2002 | Nair et al. | |
| 2002/0156918 A1 | 10/2002 | Valdevit et al. | |
| 2003/0091062 A1 | 5/2003 | Lay et al. | |
| 2003/0126297 A1 | 7/2003 | Olarig et al. | |

OTHER PUBLICATIONS

Lan Man Standards Committee, "Amendment to the Carrier Sense Multiple Access with Collision Detection (CSMA/CD) Access Method and Physical Layer Specifications—Aggregation of Multiple Link Segments", IEEE Std. 802.3ad-2000 Mar. 30, 2000.
PCT Search Report Int'l application No. PCT/US05/28327, mailing date Dec. 16, 2005.
PCT Written Opinion Int'l application No. PCT/US05/28327, mailing date Dec. 16, 2005.

* cited by examiner

*Primary Examiner*—Afsar M. Qureshi
(74) *Attorney, Agent, or Firm*—Weaver Austin Villeneuve & Sampson LLP

(57) ABSTRACT

According to the present invention, methods and apparatus are provided to allow efficient and effective aggregation of ports into port channels in a fiber channel network. A local fiber channel switch can automatically identify compatible ports and initiate exchange sequences with a remote fiber channel switch to aggregate ports into port channels. Ports can be aggregated synchronously to allow consistent generation of port channel map tables.

31 Claims, 8 Drawing Sheets

PORT AGGREGATION FOR FIBRE CHANNEL INTERFACES

BACKGROUND OF THE INVENTION

1. Field of the Invention

The present invention generally relates to fiber channel ports. More specifically, the present invention provides techniques and mechanisms for efficiently aggregating fiber channel ports into port channels.

2. Description of Related Art

Neighboring nodes in a fiber channel network are typically interconnected through multiple physical links. For example, a local fiber channel switch may be connected to a remote fiber channel switch through four physical links. In many instances, it may be beneficial to aggregate some of the physical links into logical links. That is, multiple physical links can be combined to form a logical interface to provide higher aggregate bandwidth, load balancing, and link redundancy. When a frame is being transmitted over a logical link, it does not matter what particular physical link is being used as long as all the frames of a given flow are transmitted through the same link. If a constituent physical link goes down, the logical link can still remain operational.

However, conventional mechanisms for aggregating ports into port channels are limited. Some aggregation mechanisms exist for other networks such as Ethernet networks. However, the other aggregation mechanisms can not be applied to fiber channel networks because of characteristics unique to fiber channel.

Consequently, it is desirable to provide techniques for improving aggregation of fiber channel switch port into port channels.

SUMMARY OF THE INVENTION

According to the present invention, methods and apparatus are provided to allow efficient and effective aggregation of ports into port channels in a fiber channel network. A local fiber channel switch can automatically identify compatible ports and initiate exchange sequences with a remote fiber channel switch to aggregate ports into port channels. Ports can be aggregated synchronously to allow consistent generation of port channel map tables.

In one embodiment, a method for aggregating ports in a fiber channel fabric is provided. It is determined that a plurality of local ports at a local fiber channel switch are compatible. Identifiers for the plurality of local ports are sent to a remote fiber channel switch. The remote fiber channel switch determines if a plurality of remote ports are compatible, the plurality of remote ports corresponding to the plurality of local ports. An indication that one or more of the remote physical ports are compatible is received. A port channel including one or more of the local ports corresponding to the compatible remote ports is created.

In another embodiment, a fiber channel switch is provided. The fiber channel switch includes memory, a plurality of local ports, and a processor. The plurality of local ports are coupled to a remote fiber channel switch through a plurality of remote ports. The processor is configured to determine that a subset of the plurality of local ports at a local fiber channel switch are compatible and send identifiers for the subset of the plurality of local ports to a remote fiber channel switch. The remote fiber channel switch determines if a subset of the plurality of remote ports are compatible. The subset of the plurality of remote ports corresponds to the subset of the plurality of local ports.

In another embodiment, a fiber channel network is described. The fiber channel network includes a local fiber channel switch and a remote fiber channel switch. The local fiber channel switch aggregates a compatible subset of the plurality of local ports and sends identifiers for the compatible subset of the plurality of local ports to the remote fiber channel switch. The remote fiber channel switch determines if a subset of the plurality of remote ports are compatible. The subset of the plurality of remote ports corresponds to the compatible subset of the plurality of local ports.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1:
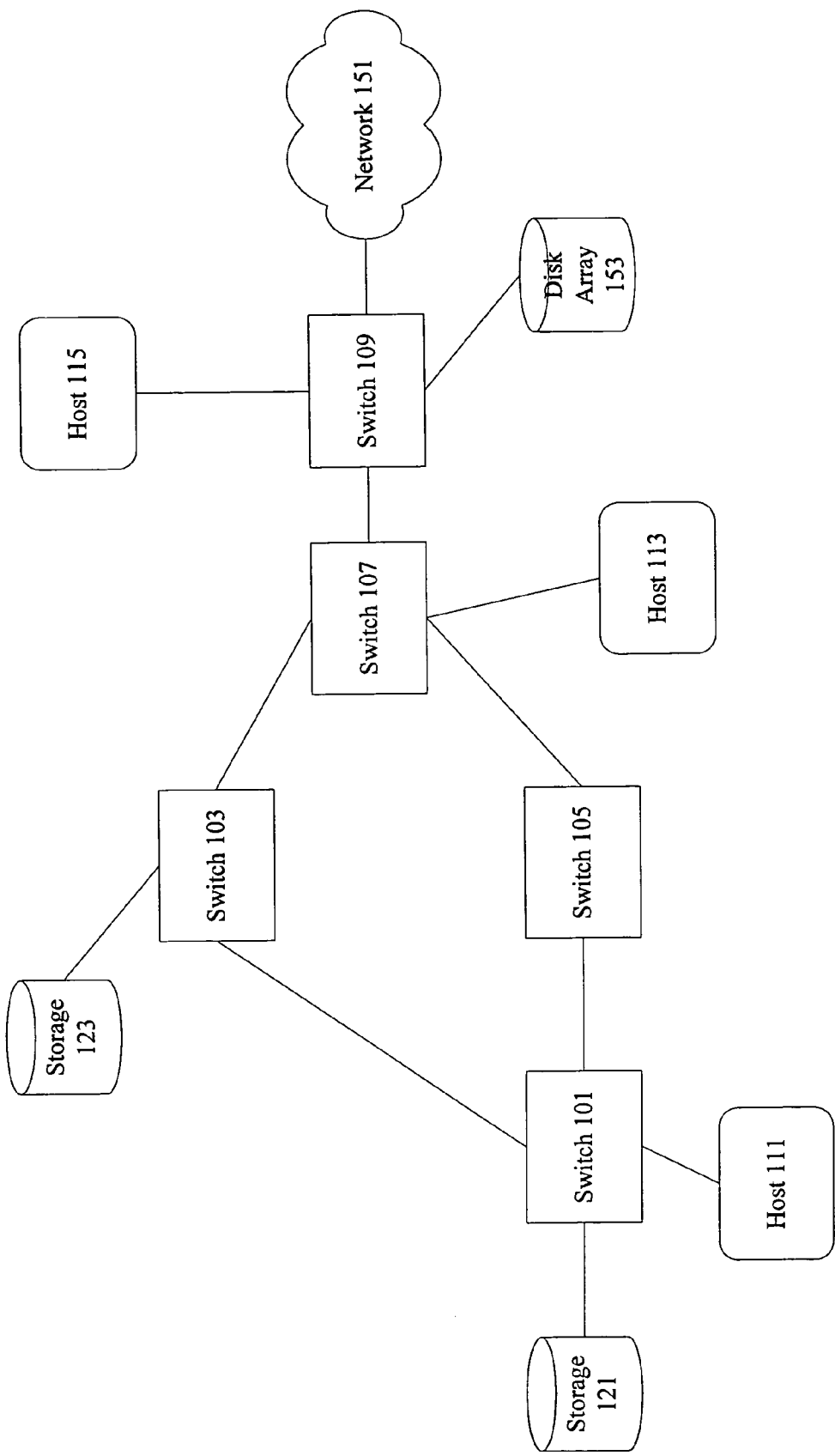
FIG. 1 is a diagrammatic representation showing a fiber channel network.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fiber channel networks. However, it should be noted that the techniques of the present invention can be applied to fiber channel network variations. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Switches in a fiber channel network are typically interconnected using multiple physical links. The physical links connecting a pair of switches allows transmission of data and control signals. In some instances, it is useful to aggregate multiple physical links into a logical link. Physical links are also referred to herein as physical interfaces and channels while logical links are also referred to herein as logical interfaces and port channels. For example, a local switch may be connected to a remote switch through four physical links. Instead of having to transmit data through a particular physical link, the physical links can be aggregated to form one or more logical links. In one example, all four physical links are aggregated into a single logical link. Instead of having data transmitted through a particular physical link, the data can merely be transmitted over a particular logical link without regard to the particular physical interface used. Aggregating physical links into a logical link allows for higher aggregated bandwidth, load balancing, and link redundancy. For example, if a particular physical link fails or is overloaded, data can still be transmitted over the logical link.

However, mechanisms for setting up logical links or port channels are limited. Many implementations require manual setup of port channels by administrators at both a local and a remote switch. Administrators are required to enable physical ports in port channels to facilitate synchronization of port channel bring up. Synchronization can be difficult and error detection for incorrect configurations of port channels is also inadequate. For example, some port channel misconfigurations cannot be detected and one end of a physical link may operate as a port channel while the other end is not configured in a port channel. Alternatively, one end of a physical link may operate as a port channel while the other end is configured as part of a different port channel. Furthermore, some ports may be included in a port channel even when they have configuration or operation parameters that are incompatible with the port channel. Similarly, some ports may be included in a port channel even when they connect to different switches. Some of these incorrectly configured ports can get disabled or suspended even though they should be able to operate as individual physical links. Numerous error conditions exist for which there are insufficient mechanisms for detection and correction.

In other examples, synchronization can be a problem when the physical layer of the ports configured in a port channel goes down and comes back up, as one end may enable traffic on the port channel before the other end has completed bringing up its port channel interface. That is, a local switch can begin transmitting data over a particular port channel even if the port channel is not yet configured at a remote switch.

Furthermore, the limited error detection provided using conventional mechanisms is enabled primarily using disparate software components such as domain management protocols, exchange link parameters (ELP), and exchange peer parameters (EPP). Error detection using disparate components can often be difficult to integrate.

Consequently, the techniques and mechanisms of the present invention allow automatic detection of compatible ports to enable automatic creation of port channels. Port channels can be effectively brought up at either a local switch or a remote switch after either automatic creation of port channels or manual configuration of port channels. Robust error detection capabilities allow the correction of improper configurations and connections. Member physical ports of a port channel can operate as individual links if they cannot be configured to be part of port channel. Furthermore, synchronization is supported so that requests and responses belonging to the same flow can be carried over the same physical link in a port channel in both directions. In many conventional implementations, such as Ethernet for example, a flow belonging to a particular port channel could be carried over different physical links during send and receive phases.

FIG. 1 shows one example of a storage area network implemented using fiber channel that can use efficient port channel configuration mechanisms. A switch 101 is coupled to switches 103 and 105 as well as to a host 111 and storage 121. Switch 101 may be connected to other entities through multiple physical links or channels configured as logical links or port channels. In one embodiment, host 111 may be a server or client system while storage 121 may be single disk or a redundant array of independent disks (RAID). Switches 103 and 105 are both coupled to switch 107. Switch 107 is connected to host 113 and switch 103 is connected to storage 123. Switch 109 is connected to host 115, switch 107, disk array 153, and an external network 151 that may or may not use fiber channel.

Fiber channel networks typically allow transmission using a credit mechanism that is distinct from the typical IP network transmission mechanism. Instead of dropping packets, fiber channel networks only allow transmission when sufficient credits are available. For example, a buffer-to-buffer credit mechanism is used to control traffic flow from switch 107 to switch 109. In typical implementations, a network node such as a switch 109 allocates a predetermined number of credits to switch 107. Every time the switch 107 transmits frames to switch 109, credits are used. A switch 109 can then allocate additional credits to switch 107 when the switch 109 has available buffers. When a switch 107 runs out of credits, it can no longer transmit to switch 109.

Figure 2:
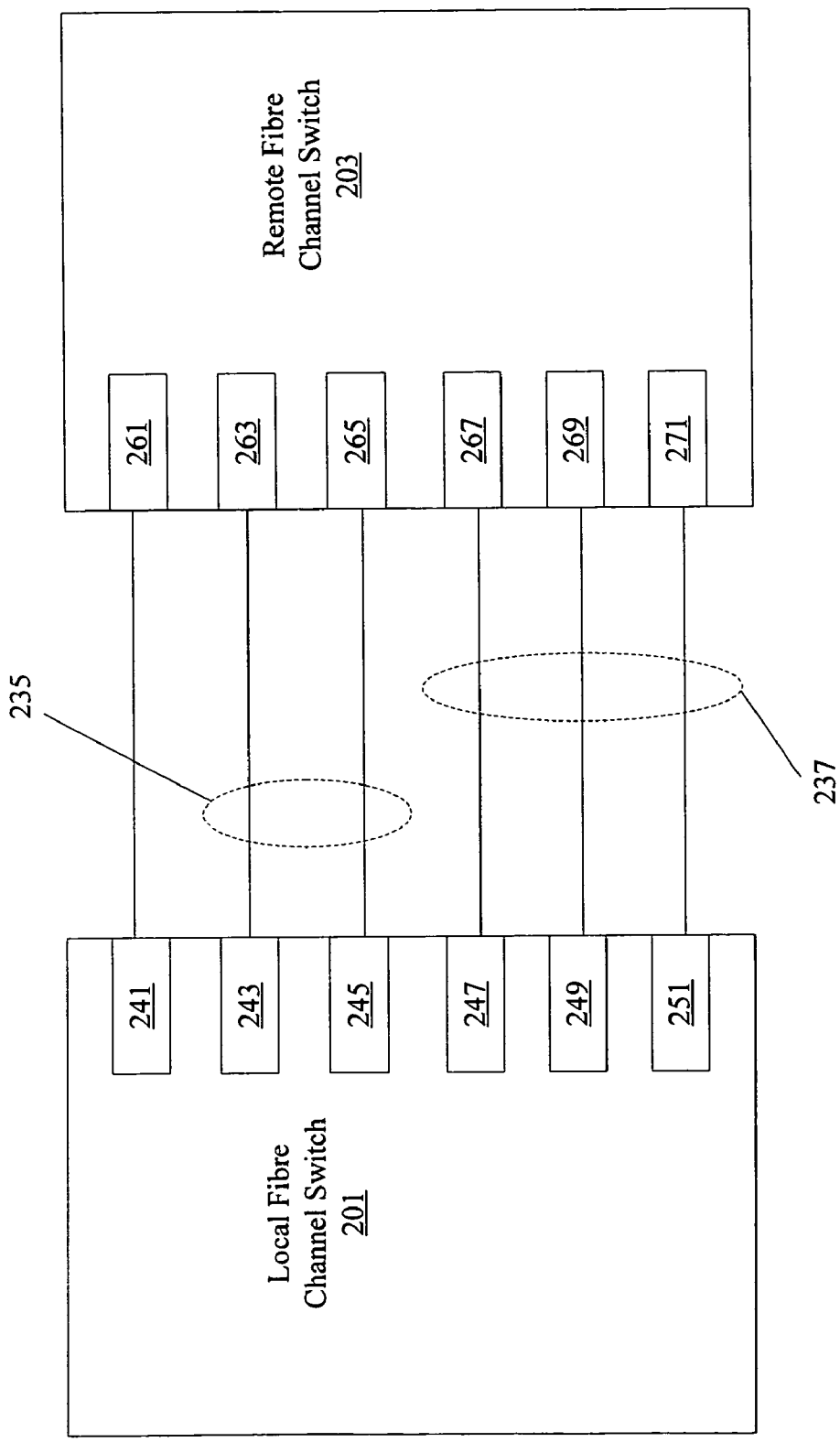
FIG. 2 is a diagrammatic representation showing two fiber channel switches and associated ports.

FIG. 2 is a diagrammatic representation showing links between two switches, such as two fiber channel switches shown in FIG. 1. A local fiber channel switch 201 includes local ports 241, 243, 245, 247, 249, and 251. A remote fiber channel switch 203 includes remote ports 261, 263, 265, 267, 269, and 271. Local port 241 is coupled to remote port 261 through an individual physical link or channel. Connected ports are also referred to herein as peer ports. Local port 243 is coupled to remote port 263 and local port 245 is coupled to remote port 265. The two resulting physical links are aggregated to form port channel 235. Local ports 247, 249, and 251 are coupled to remote ports 267, 269, and 271 respectively. The three resulting physical links are aggregated to form port channel 237.

According to various embodiments, local fiber channel switch 201 and remote fiber channel switch both have associated identifiers. In some examples, the identifiers are globally unique identifiers such as a global switch world wide names (WWNs). Each local port 241, 243, 245, 247, 249, and 251 and each remote port 261, 263, 265, 267, 269, and 271 can also be associated with identifiers. In some examples, the identifiers are port WWNs. The port WWNs are typically used for debugging or identifying the peer port in alert or warning messages. However, according to various embodiments, the techniques of the present invention use WWNs as globally unique identifiers to aggregate ports instead of using compatibility keys which are only locally unique. Compatibility keys are mechanisms typically used by other protocols such as Ethernet for aggregation.

Furthermore, the techniques of the present invention use a request/response mechanism for its exchanges as compared to timer based exchanges in other protocols such as Ethernet.

Each port channel can also be provided with identifiers. In some examples, each port channel has a port channel identifier at a local switch and a different port channel identifier at a remote switch. According to various embodiments, the port channel identifier is a globally unique port channel WWN. In some examples, the length of the global switch WWNs, the port WWNs, and the port channel WWNs is 8-bytes.

Each entity can also have additional parameters to aid in the set up of port channels. According to various embodiments, parameters such as a channeling model, a channeling intent and a channeling status are included. A channeling model indicates to a peer port the channel group is automatically created or user configured. A channeling intent parameter indicates the peer port if this port intends to participate in a port channel. Otherwise, the port intends to operate as an individual port. The channeling status parameter tells the peer port about its current channeling status. This parameter is exchanged by the attached peer ports to agree upon the channeling status of the link and to ensure that both ends are synchronized.

Figure 3:
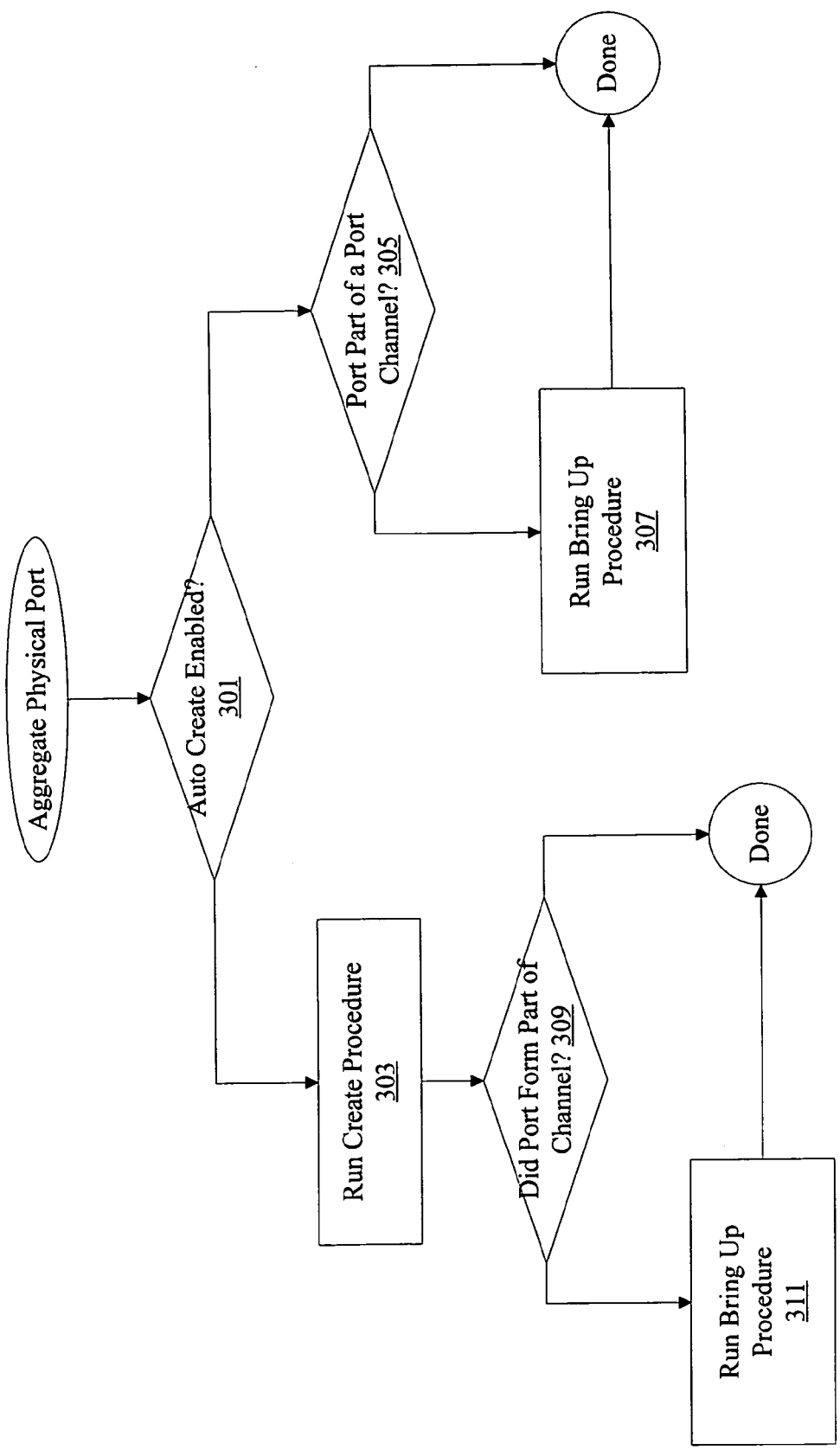
FIG. 3 is a flow process diagram showing a technique for configuring a physical port as part of a port channel.

A variety of parameters can be used to aggregate physical ports. FIG. 3 is a flow process diagram showing one technique for aggregating physical ports into a logical port. And 301, it is determined if auto create functionality is enabled. According to various embodiments, auto create functionality allows automatic configuration and detection of compatible physical ports as well as aggregation into one or more logical ports. Auto creation does not require user intervention. In other examples, administrators can manually arrange ports for aggregation.

If auto create is not enabled, it is determined at 305 if the port is part of a port channel. This determination can be made by using information provided by an administrator. If the port is not part of a port channel, no aggregation is necessary. However, if the port is part of a port channel, the bring up procedure is run at 307 to either create a new port channel for the port or add the port to an existing port channel.

If auto create is enabled at 301 a create procedure is run at 303. According to various embodiments, a create procedure runs compatibility checks at a local switch for potential candidate ports eligible to form a port channel. In some examples, the ports are locked during the compatibility checking so that compatibility parameter values cannot be changed until the checks are completed. Compatibility parameters include parameters such as line speed and trunking mode. The same compatibility parameters checked by an administrator during manual configuration can be checked during auto creation. A remote switch only needs to perform compatibility checks during particular circumstances such as circumstances triggered by a local switch.

After the create procedure is run, one or more ports may be grouped into port channels. If the port is part of a port channel at 309, a bring up procedure is run at 311. According to various embodiments, the bring up procedure is similar to that run at 307. If the port is not part of a port channel at 309, no additional processing is needed.

Figure 4:
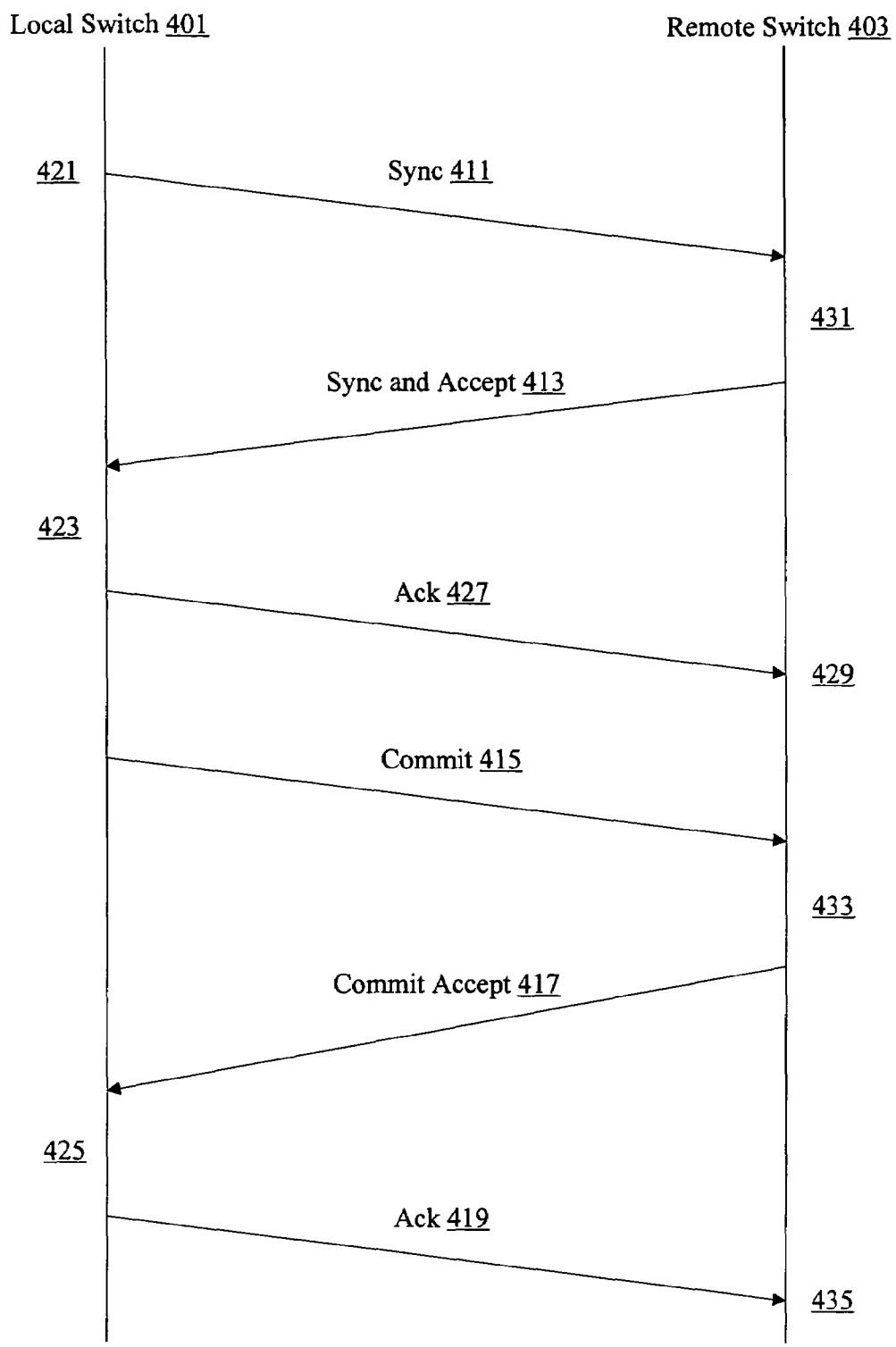
FIG. 4 is an exchange diagram showing a technique for bringing up an initial physical port in a port channel

FIG. 4 is an exchange diagram showing one example of a bring up procedure used for a port creating a new port channel. A local switch 401 is coupled to a remote switch 403. The local switch 401 includes a physical port A1 coupled to physical port B1 included in remote switch 403. When two peer ports A1 and B1 are being aggregated into a port channel, the peer switches 401 and 403 typically already know the world wide names of the individual physical peer ports. However, the peer switches only know the world wide name of their own logical port or port channel. That is, both switches have the individual physical link configured, but the link is not yet part of a port channel. At 421, a local switch 401 sends a synchronize (sync) message 411 to the remote switch 403 to begin the process of creating a port channel including ports A1 and B1.

In some examples, the sync message 411 includes a local port channel identifier and a remote port channel identifier. In one particular example, the local port channel identifier is set to the world wide name of the local port channel assigned by the local switch 401. The remote port channel identifier is left blank to indicate that the port A1 is being aggregated as part of a new port channel. The sync message 411 can also include other parameters such as channel status, channel model, or channel intent.

At 431, remote switch 403 uses the information received from the local switch 401 to update a port channel database. In one example, the remote switch 403 can check if the port B1 is already assigned to a different port channel. If the port is not already assigned to a different port channel, the remote switch 403 can proceed and send a sync accept message 413 in response to the sync message 411. The sync accept message 413 includes a remote switch 403 assigned world wide name for the remote port channel identifier. The sync accept message indicates that a port channel can now be formed. At 423, local switch 401 uses the information to update its own port channel database. However, the port channel may not yet be operational until the hardware configuration is completed. The local switch 401 continues hardware configuration such as line card configuration to make the port A1 part of the port channel. An acknowledgment 427 is sent and received by remote switch 403 at 429. In some examples, the local switch 401 sends a commit signal 415 when hardware configuration is complete.

The remote switch 403 receives the commit signal at 433 and begins its own hardware configuration. On completion of its hardware configuration, remote switch 403 sends out a commit accept signal 417 to indicate to local switch 401 that hardware configuration is completed. According to various embodiments, local switch 401 receives the commit accept signal 417 and notifies relevant applications that the port channel is now operational at 425 and that port A1 is the first operational port included. The local switch 401 sends an acknowledge message 419. When the remote switch 403 receives the acknowledge, it notifies relevant applications that the port channel is operational at 435 and that port B1 is the first operational port included. FIG. 4 is an exchange diagram showing an example of a bring up procedure for the first port in a new port channel.

Figure 5:
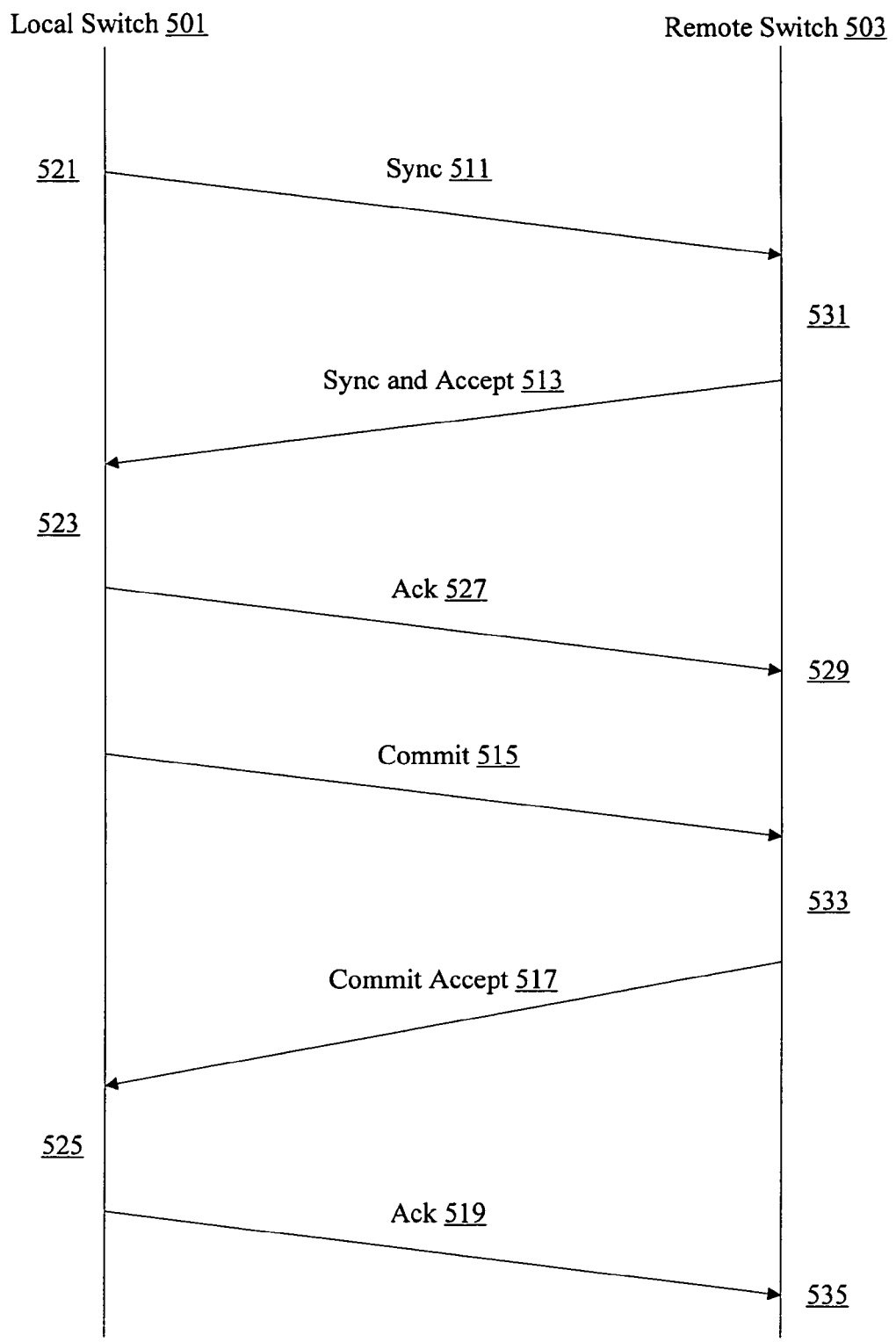
FIG. 5 is an exchange diagram showing a technique for bringing up a subsequent physical port in a port channel.

FIG. 5 is an exchange diagram depicting one example of a bring up procedure for a subsequent port added to the port channel. A local switch 501 is coupled to a remote switch 503. The local switch 501 includes a physical port A1 coupled to physical port B1 included in remote switch 503. The physical ports A1 and B1 are included in an existing port channel C1. Physical ports A2 and B2 are not yet included in the existing port channel C1.

When two peer ports A2 and B2 are aggregated into a port channel C1, the peer switches 501 and 503 typically already know the world wide names of the individual physical peer ports A2 and B2 as well as the world wide name information of the port channel C1. Consequently, the port channel is already successfully established. According to various embodiments, local switch 501 and remote switch 503 perform parameter checking to ensure that the new physical port A2 and B2 can be safely added to the existing port channel C1. At 521, a local switch can check configuration parameters to ensure that physical ports A1 and A2 at the local switch 501 are compatible. The compatibility checking can be performed anytime. In some examples, compatibility checking is checked before a local switch 501 sends a synchronize (sync) message 511 to the remote switch 503 to begin the process of aggregating ports A2 and B2 into the port channel.

In some examples, the sync message 511 includes local port channel identifier and a remote port channel identifier. In one particular example, the local port channel identifier is set to the world wide name of the local port channel assigned by the local switch 501. The remote port channel identifier is filled with the existing port channel identifier to indicate that the port A2 is being aggregated into existing port channel C2. The sync message 511 can also include other parameters such as channel status, channel model, or channel intent.

At 531, remote switch 503 uses the information received from the local switch 501 to verify port B2 is compatible with other port in port channel C2. In one example, configuration parameters associated with B2 are checked against configuration parameters associated with B1. The remote switch 503 can also check if the port B2 is already assigned to a different port channel. If the port B2 is compatible with port B1, the remote switch 503 can proceed and send a sync accept message 513 in response to the sync message 511 to indicate that the port B2 can be aggregated into the port channel. The sync accept message indicates that a port channel can now be modified. At 523, local switch 501 uses the information to update its own port channel database. However, the port channel may not yet be fully operational until the hardware configuration is completed. The local switch 501 continues hardware configuration such as line card configuration to make the port A2 part of the port channel C1. An acknowledgment 527 is sent and received by remote switch 503 at 529. In some examples, the local switch 501 sends a commit signal 515 when hardware configuration is complete.

The remote switch 503 receives the commit signal at 533 and begins its own hardware configuration. On completion of its hardware configuration, remote switch 503 sends out a commit accept signal 517 to indicate to local switch 501 that hardware configuration is completed. According to various embodiments, local switch 501 receives the commit accept signal 517 and notifies relevant applications that the port channel is now fully operational at 525 and that port A2 has been aggregated into port channel C1. The local switch 501 can also send out an acknowledge message 519. When the remote switch 503 receives the acknowledge, it notifies relevant applications that the port channel is operational at 535 and that port B2 has been aggregated into port channel C1. In one embodiments, the techniques of the present invention contemplate using a two phase SYNC and COMMIT mechanism similar to the mechanism used in EPP.

Figure 6:
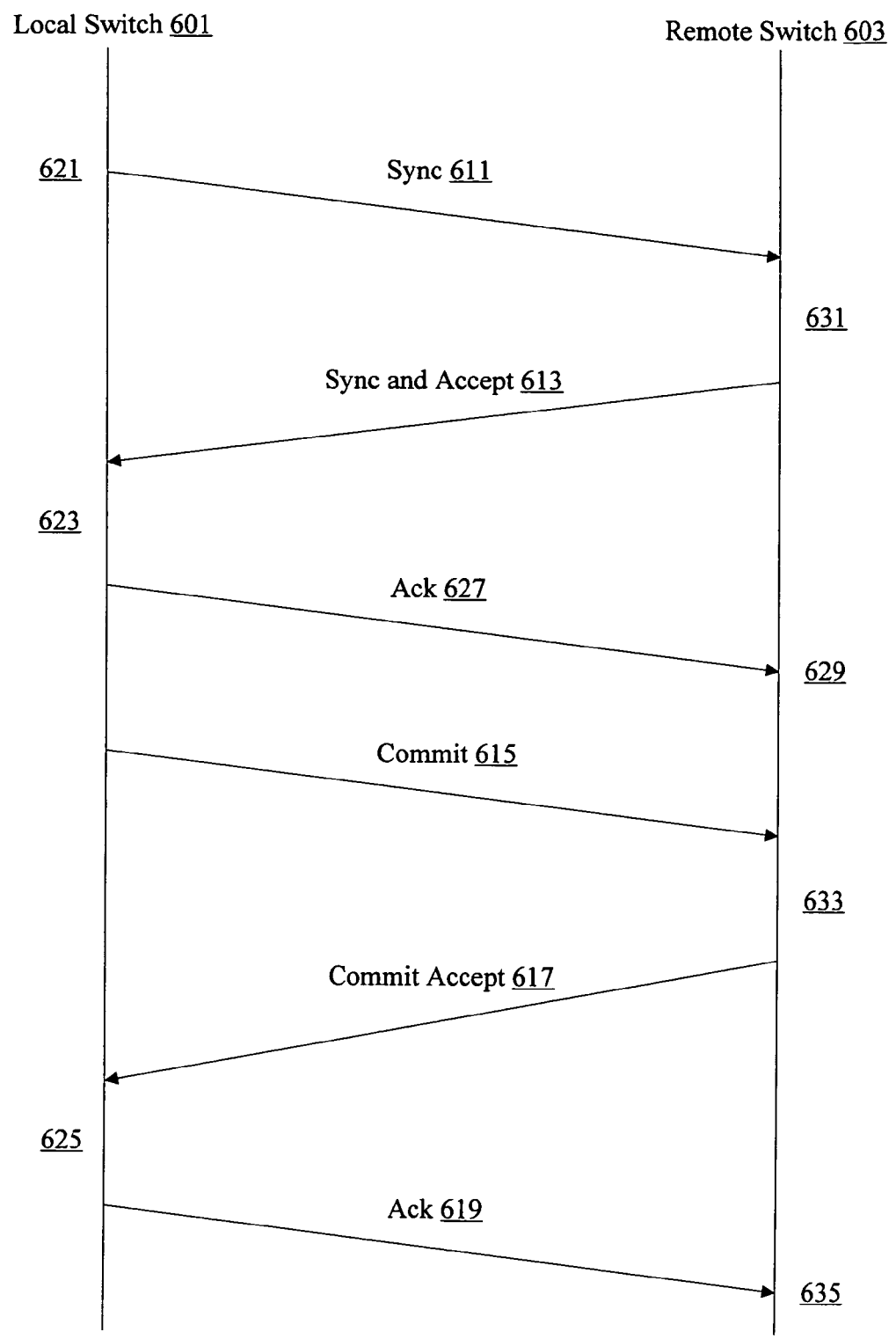
FIG. 6 is an exchange diagram showing a technique for automatically creating a port channel.

FIGS. 4 and 5 show examples of ports being aggregated into a port channel. At a particular switch, ports can be selected for aggregation into a port channel in a variety of manners. FIG. 6 is an exchange diagram showing automatic selection of ports at a switch for aggregation into a port channel. A local switch 601 is coupled to a remote switch 603. In one example, the local switch 601 includes physical ports A1, A2, A3, and A4 while remote switch 603 includes physical ports B1, B2, B3, and B4. No port channels have been formed.

When a port channel is being automatically generated, the peer switches 601 and 603 typically already know the world wide names of the individual physical peer ports A1, A2, A3, A4, B1, B2, B3, and B4. The local switch 601 can perform configuration and parameter checking to determine which one of the physical ports A1, A2, A3, and A4 are compatible. However, the local switch 601 does not know whether physical ports B1, B2, B3, and B4 are compatible at the remote switch 603. According to various embodiments, local switch 601 performs compatibility checking to determine port channel arrangements and sends information to remote switch 603 to trigger compatibility checking remotely. For example, the local switch 601 may determine that ports A1, A2, and A4 are compatible and can form a port channel at 621. The local switch 621 then sends a synchronize (sync) message 611 to the remote switch 603 to begin the process of automatically generating a port channel C1.

In some examples, the sync message 611 includes remote port identifiers A1, A2, and A4 indicating that the local ports A1, A2, and A4 are compatible and is transmitted to the remote switch 603 using ports A1 and B2. The sync message 611 can also include port channel identifiers for the compatible port channels that are already present on local switch 601. The sync message 611 can also include other parameters such as channel status, channel model, or channel intent.

At 631, remote switch 603 uses the information received from the local switch 601 to verify that the peer ports of A1, A2, and A4 are compatible. That is, ports B1, B2, and B4 are checked for compatibility. In one example, only ports B1 and B2 may be compatible, and consequently only ports A1, A2, B1, and B2 can be included in the port channel. In another example, ports B1, B2, and B4 are compatible, so ports A1, A2, A4, B1, B2, and B4 can be aggregated into port channel C1. According to various embodiments, if the port B2 is compatible with port B1, the remote switch 603 can proceed and send a sync accept message 613 in response to the sync message 611 to indicate that the port B2 can be aggregated into the port channel. It should be noted that remote switch 603 can send a list indicating that ports B2 and B4 are compatible with B1. However, the remote switch 603 sends only one compatible port B2 back for several reasons, and in the process of selection compatible port channels get priority over compatible individual ports.

One reason is that aggregation mechanisms and techniques can be implemented more elegantly by handling ports on an individual basis. Any individual port will either start a new port channel, be added to an existing port channel, or operate stand alone. There is no need to keep track of groups of ports to be aggregated. Another reason is that fewer ports need to be locked if only a single port is being aggregated at any one time. The sync accept message indicates that a port channel can now be modified. At 623, local switch 601 receives the information and recognizes that A1 and A2 can now be aggregated into port channel C1. However, the port channel may not yet be fully operational until the hardware configuration is completed. An acknowledgment 627 is sent and received by remote switch 603 at 629. In some examples, the local switch 601 sends a commit signal 615 when hardware configuration is complete.

The remote switch 603 receives the commit signal at 633 to create port channel C1 including ports B1 and B2. Hardware configuration can now be performed. On completion of its hardware configuration, remote switch 603 sends out a commit accept signal 617 to indicate to local switch 601 that hardware configuration is completed. According to various embodiments, local switch 601 receives the commit accept signal 617 and notifies relevant applications that the port channel is now fully operational at 625 and that ports A1 and A2 have been aggregated into port channel C1. The local switch 601 can also send out an acknowledge message 619. When the remote switch 603 receives the acknowledge, it notifies relevant applications that the port channel is fully operational at 635 and that ports B1 and B2 have been aggregated into port channel C1.

The aggregation techniques allow efficient and automatic creation and bring up of port channels. Although the techniques do not have to be implemented in a synchronous manner, in many examples it is beneficial to bring up ports in order.

Figure 7:
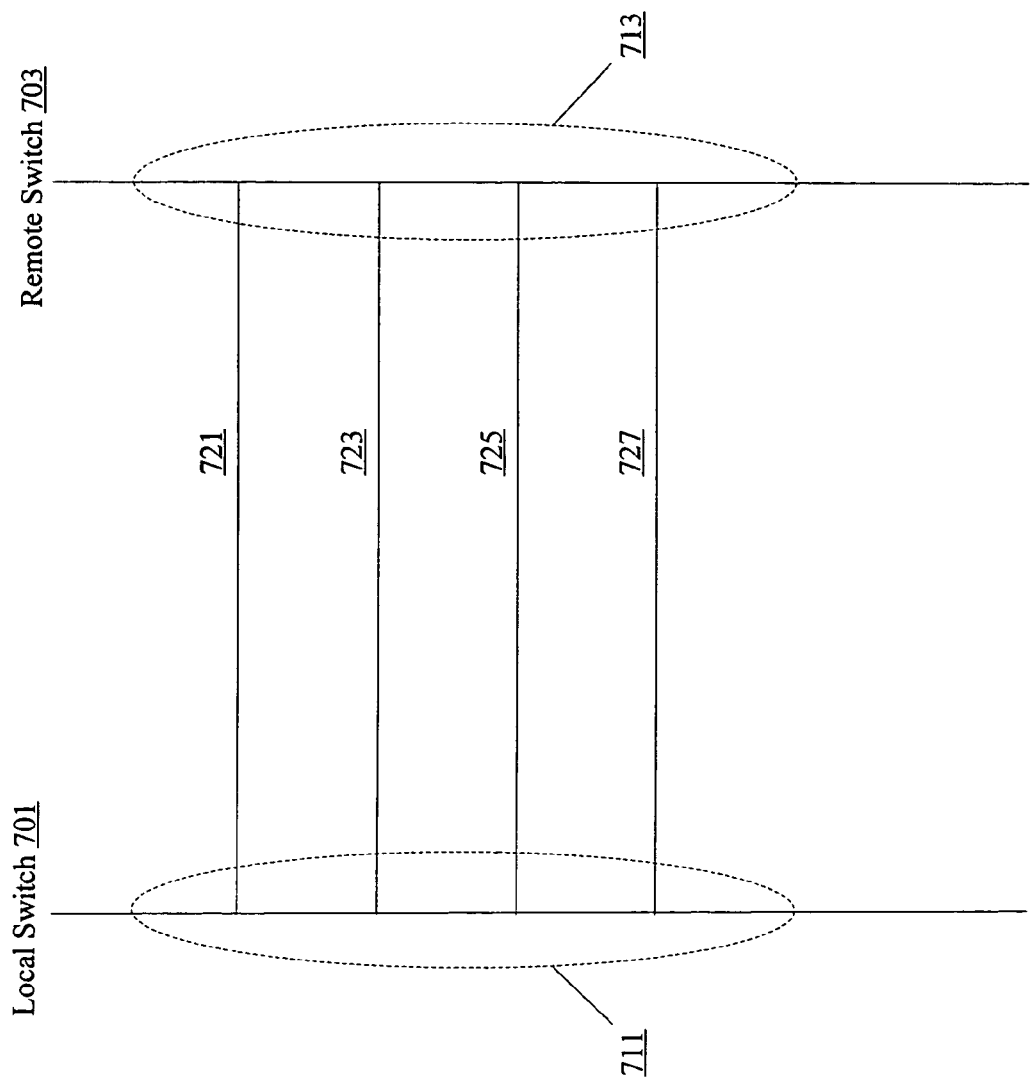
FIG. 7 is a diagrammatic representation showing synchronization.

FIG. 7 is a diagrammatic representation showing synchronous aggregation of ports into a port channel. A local switch 701 is coupled to a remote switch 703 through links 721, 723, 725, and 727. According to various embodiments, the links are being aggregated into port channel 711 at the local switch 701 and port channel 713 at the remote switch 703 in a synchronous manner. That is the peer ports corresponding to each link are brought up in the same order at both the local switch 701 and the remote switch 703.

A database such as a port channel map table is used store the links included in a port channel. The links and/or port information is entered into the table based on the order in which they were brought up. The port channel map table is used to select the physical link through which a frame is transmitted. In conventional implementations, the order of the peer ports listed in the port channel map table can be different for both the local switch 701 and the remote switch 703.

Based on this scheme, frames for a given flow are transmitted through the same physical port of the port channel. However, unless there is proper synchronization of the port channel map tables at the two ends of a port channel, it is possible that requests and responses for the same flow are carried over two different physical links. For example, requests may be carried over link 721 while responses are carried over 723. This is undesirable for port channels as it affects applications like write acceleration that assume the traffic for a given flow is carried over the same physical link in both directions.

According to various embodiments of the present invention, links are brought up in order. A first link is selected for bring up. No effort is made to bring up other links is attempted until the exchange associated with the first link is completed. Consequently, port channel map tables at the local switch 701 and at the remote switch 703 are consistent. Port channel map table entries are synchronized at both ends so that all frames for a given flow are carried over the same physical link in both directions after the exchanges are completed.

As described above, techniques for aggregating ports may be performed in a variety of network devices or switches. According to various embodiments, a switch includes a processor, network interfaces, and memory. A variety of ports, Media Access Control (MAC) blocks, and buffers can also be provided as will be appreciated by one of skill in the art.

Figure 8:
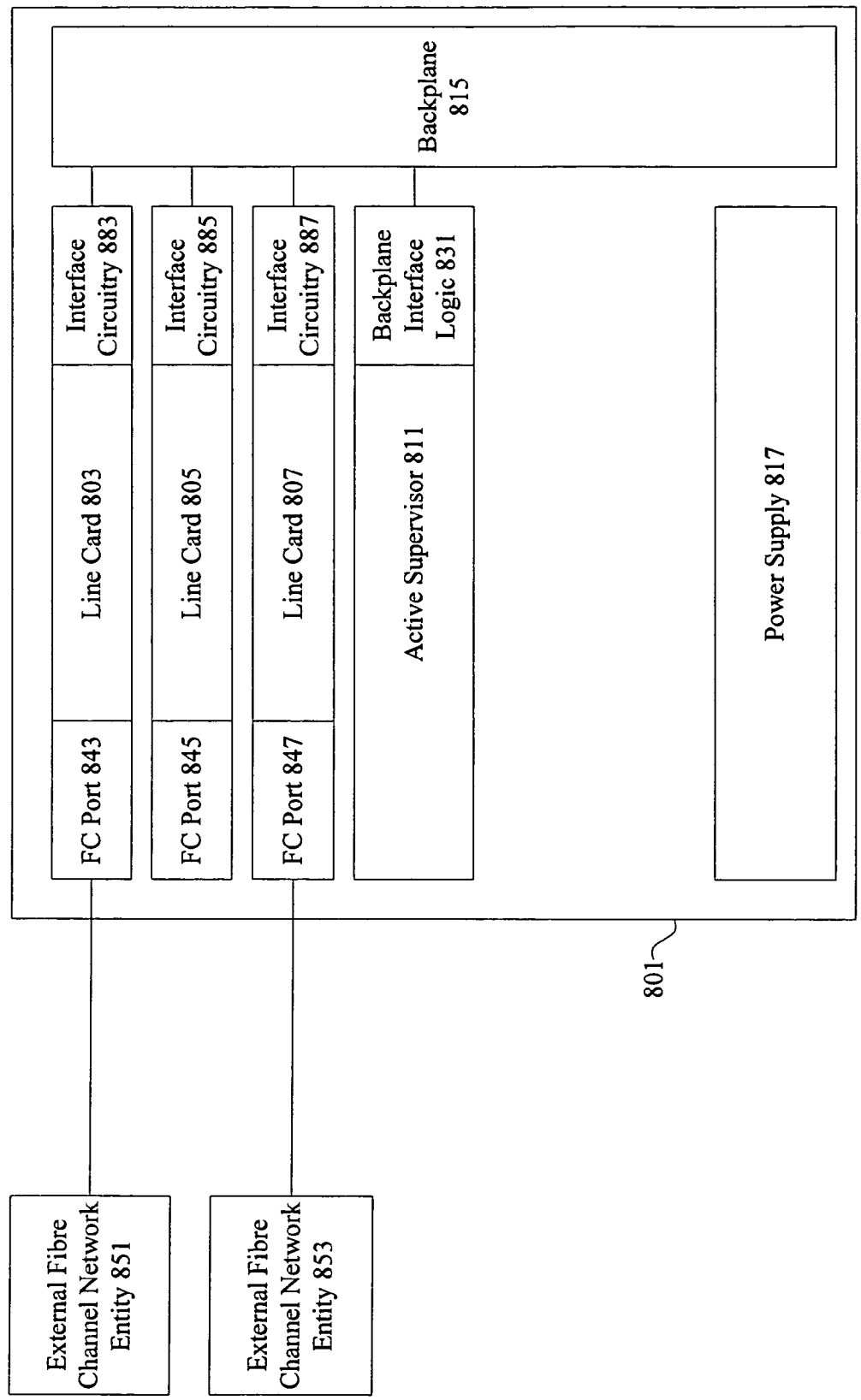
FIG. 8 is a diagrammatic representation showing a network device suitable for implementing the techniques and mechanisms of the present invention.

FIG. 8 is a diagrammatic representation of one example of a fiber channel switch that can be used to implement techniques of the present invention. Although one particular configuration will be described, it should be noted that a wide variety of switch and router configurations are available. The fiber channel switch 801 may include one or more supervisors 811. According to various embodiments, the supervisor 811 has its own processor, memory, and storage resources.

Line cards 803, 805, and 807 can communicate with an active supervisor 811 through interface circuitry 883, 885, and 887 and the backplane 815. According to various embodiments, each line card includes a plurality of ports that can act as either input ports or output ports for communication with external fiber channel network entities 851 and 853. The backplane 815 can provide a communications channel for all traffic between line cards and supervisors. Individual line cards 803 and 807 can also be coupled to external fiber channel network entities 851 and 853 through fiber channel ports 843 and 847.

External fiber channel network entities 851 and 853 can be nodes such as other fiber channel switches, disks, RAIDS, tape libraries, or servers. It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, and utility applications.

According to one embodiment, the routing application is configured to provide credits to a sender upon recognizing that a frame has been forwarded to a next hop. A utility application can be configured to track the number of buffers and the number of credits used. A domain manager application can be used to assign domains in the fiber channel storage area network. Various supervisor applications may also be configured to provide functionality such as flow control, credit management, and quality of service (QoS) functionality for various fiber channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for aggregating ports in a fibre channel fabric, the method comprising:
   determining that a plurality of local ports at a local fibre channel switch are compatible by running compatibility checks evaluating compatibility parameters including trunking mode;
   sending identifiers for the plurality of local ports to a remote fibre channel switch, wherein the remote fibre channel switch determines if a plurality of remote ports are compatible, the plurality of remote ports corresponding to the plurality of local ports; wherein the plurality of local ports and the plurality of remote ports are locked during the compatibility checking so that compatibility parameter values cannot be changed until the compatibility checking is completed
   receiving an indication that one or more of the remote physical ports are compatible;
   creating a port channel including one or more of the local ports corresponding to the compatible remote ports.

2. The method of claim 1, wherein the port channel is a logical port.

3. The method of claim 1, wherein the remote fibre channel switch determines if the plurality of remote ports are compatible with each other.

4. The method of claim 1, wherein creating a local port channel comprises providing a unique local port channel identifier.

5. The method of claim 4, wherein the unique local port channel identifier is a local port channel world wide name (WWN).

6. The method of claim 5, wherein the remote fibre channel switch creates a remote port channel corresponding to the local port channel.

7. The method of claim 6, wherein the remote port channel is provided a unique remote port channel identifier.

8. The method of claim 7, wherein the unique remote port channel identifier is a remote port channel WWN.

9. The method of claim 1, wherein determining that the plurality of ports are compatible comprises determining if the plurality of ports have the same operation parameters.

10. The method of claim 9, wherein operation parameters include port speed.

11. The method of claim 1, wherein the plurality of local ports are aggregated into the port channel in a synchronous manner.

12. A fibre channel switch, comprising:
   memory;
   a plurality of local ports coupled to a remote fibre channel switch through a plurality of remote ports;
   a processor configured to determine that a subset of the plurality of local ports at a local fibre channel switch are compatible by running compatibility checks evaluating compatibility parameters including trunking mode and send identifiers for the subset of the plurality of local ports to a remote fibre channel switch, wherein the remote fibre channel switch determines if a subset of the plurality of remote ports are compatible, the subset of the plurality of remote ports corresponding to the subset of the plurality of local ports;
   wherein the plurality of local ports and the plurality of remote ports are locked during the compatibility checking so that compatibility parameter values cannot be changed until the compatibility checking is completed.

13. The fibre channel switch of claim 12, wherein the processor is further configured to receive an indication that one or more of the remote physical ports are compatible and create a port channel including two or more of the local ports corresponding to the compatible remote ports.

14. The fibre channel switch of claim 12, wherein the port channel is a logical port.

15. The fibre channel switch of claim 12, wherein the remote fibre channel switch determines if the subset of the plurality of remote ports are compatible with each other.

16. The fibre channel switch of claim 12, wherein creating a local port channel comprises providing a unique local port channel identifier.

17. The fibre channel switch of claim 16, wherein the unique local port channel identifier is a local port channel world wide name (WWN).

18. The fibre channel switch of claim 17, wherein the remote fibre channel switch creates a remote port channel corresponding to the local port channel.

19. The fibre channel switch of claim 18, wherein the remote port channel is provided a unique remote port channel identifier.

20. The fibre channel switch of claim 19, wherein the unique remote port channel identifier is a remote port channel WWN.

21. The fibre channel switch of claim 12, wherein determining that the plurality of ports are compatible comprises determining if the plurality of ports have the same configuration parameters.

22. The fibre channel switch of claim 21, wherein operation parameters include port speed.

23. The fibre channel switch of claim 12, wherein the plurality of local ports are aggregated into the port channel in a synchronous manner.

24. A fibre channel network, comprising:
   a local fibre channel switch including a plurality of local ports;
   a remote fibre channel switch including a plurality of remote port;
   wherein the local fibre channel switch aggregates a compatible subset of the plurality of local ports and sends identifiers for the compatible subset of the plurality of local ports to the remote fibre channel switch, wherein the remote fibre channel switch determines if a subset of the plurality of remote ports are compatible by running compatibility checks evaluating compatibility parameters including trunking mode, the subset of the plurality of remote ports corresponding to the compatible subset of the plurality of local ports;
   wherein the plurality of local ports and the plurality of remote ports are locked during the compatibility checking so that compatibility parameter values cannot be changed until the compatibility checking is completed.

25. The fibre channel network of claim 24, wherein the local fibre channel switch is further configured to receive an indication that two or more of the remote physical ports are compatible and create a port channel including two or more of the local ports corresponding to the compatible remote ports.

26. The fibre channel network of claim 24, wherein the port channel is a logical port.

27. The fibre channel network of claim 24, wherein the remote fibre channel switch determines if the subset of the plurality of remote ports are compatible with each other.

28. The fibre channel network of claim 24, wherein creating a local port channel comprises providing a unique local port channel identifier.

29. The fibre channel network of claim 28, wherein the unique local port channel identifier is a local port channel world wide name (WWN).

30. An apparatus for aggregating physical ports in a fibre channel fabric, the apparatus comprising:
   means for determining that a plurality of local ports at a local fibre channel switch are compatible by running compatibility checks evaluating compatibility parameters including trunking mode;
   means for sending identifiers for the plurality of local ports to a remote fibre channel switch, wherein the remote fibre channel switch determines if a plurality of remote ports are compatible, the plurality of remote port corresponding to the plurality of local ports; wherein the plurality of local ports and the plurality of remote ports are locked during the compatibility checking so that compatibility parameter values cannot be changed until the compatibility checking is completed
   means for receiving an indication that two or more of the remote physical ports are compatible;
   means for creating a port channel including two or more of the local ports corresponding to the compatible remote ports.

31. The apparatus of claim 30, wherein ports are determined to be compatible when the ports can be aggregated to form a port channel.

* * * * *